United States Patent [19]

Barthelemy et al.

[11] Patent Number: 4,928,282
[45] Date of Patent: May 22, 1990

[54] LASER GENERATOR WITH PHASE MODE-LOCKING

[75] Inventors: Alain Barthelemy; Serge Maneuf; Claude Froehly, all of Limoges, France

[73] Assignee: Centre National De La Recherche Scientifique, France

[21] Appl. No.: 276,448
[22] PCT Filed: Feb. 23, 1988
[86] PCT No.: OCT/FR88/00100
§ 371 Date: Oct. 20, 1988
§ 102(e) Date: Oct. 20, 1988
[87] PCT Pub. No.: WO88/06811
PCT Pub. Date: Sep. 7, 1988

[30] Foreign Application Priority Data

Feb. 24, 1987 [FR] France ............................. 87 02411

[51] Int. Cl.$^5$ ............................................. H01S 3/098
[52] U.S. Cl. ........................................ 372/18; 372/21; 307/427
[58] Field of Search .................... 372/18, 21; 307/427

[56] References Cited

U.S. PATENT DOCUMENTS 4,635,263 1/1987 Mollenauer ............................ 372/18
4,637,026 1/1987 Liu .......................................... 372/21
4,835,778 5/1989 Kafuka et al. ......................... 372/6

Primary Examiner—Léon Scott, Jr.
Attorney, Agent, or Firm—Ostrolenk, Faber, Gerb & Soffen

[57] ABSTRACT

The laser generator includes a device for phase-locking the mode of the laser generator, the device being placed between the amplifying active medium (3) and the rear reflecting mirror (1) and comprising, firstly a non-dispersive non-linear medium (5) placed in contact with said rear mirror (1), and secondly means (11 to 16) for transforming a Gaussian beam having circular symmetry coming from the amplifying medium into a beam whose morphology is adapted to soliton propagation in said non-linear medium (5). The invention avoids the use of acousto-optical type modulators and may be applied to a very wide range of wavelengths.

12 Claims, 4 Drawing Sheets

LASER GENERATOR WITH PHASE MODE-LOCKING

BACKGROUND OF THE INVENTION

1. Field of the Invention:

The present invention relates to a laser generator with phase mode-locking, the generator comprising a resonant cavity delimited by a reflecting rear mirror, and by a semi-reflecting outlet mirror.

2. Description of the Related Art:

FIG. 1 is a diagram showing the disposition in a conventional laser source of a rear mirror 1 and an outlet mirror 2 defining a path between them of length L with the light passing through an active amplifier medium 3 lying on the path. Given the various types of laser source that exist, FIG. 1 is not limiting in the way it indicates the nature and the geometry of the active medium 3.

A conventional laser source constitutes an oscillator, and by virtue of the multiple back-and-forth passes of the light through the resonant cavity of the oscillator, and assuming that no special precautions are taken, it provides laser emission whose time structure is that of a periodic noise of period $T=2L/c$ (1) where L is the distance between the two mirrors 1 and 2, and c is the speed of light. The shape of the light intensity $i(t)$ as a function of time is shown in FIG. 3. FIG. 3 shows the correlation time dt which represents the reciprocal of the spectrum width $\Delta f$ of the emitted signal. FIG. 4 shows the frequency spectrum $I(f)$ of the periodic noise $i(t)$ shown in FIG. 3. It can be seen that the frequency spectrum corresponding to conventional laser emission comprises a plurality of groups of equidistant lines with the intervals df between the groups being the reciprocal of the period T of the time signal $i(t)$. Thus, $df=c/2L$ (2) where L is the distance between the two mirrors 1 and 2, and c is the speed of light.

However, in the FIG. 4 frequency spectrum, the intensities and the phases of the groups of equidistant lines are distributed randomly. It is thus something of a misuse of language for the groups of frequencies at which laser energy is concentrated to be called "modes".

In conventional laser emission of the periodic noise type, the amplitude of the power fluctuations in the noise is equal to the mean power $\overline{P}$ of the radiation.

Proposals have already been made for locking the modes of a laser emission by various different means, symbolized by the rectangle 4 in the FIG. 2 diagram of a laser source; with said means all relying on periodically modulating the loss or the gain to which the light is subjected on its back-and-forth passes in the resonant cavity between the mirrors 1 and 2, with the modulation being at the frequency $df=c/2L$ as defined in equation (2). This periodically enhances preferential amplification of certain regions in the periodic noise $i(t)$. Thus, a particular sequence of duration $T_O$ of pulses spaced apart in the period $T=2L/c$ become progressively less noisy and increases to the detriment of regions which do not possess the optimum phase. The laser signal of intensity $i(t)$ loses its random character and takes on the regular shape shown in FIG. 5. The frequency spectrum $I(f)$ also takes on the regular shape shown in FIG. 6 with a sequence of regularly spaced-apart peaks at intervals $df=c/2L$, with each peak having a width $1/T_O$.

The laser emission regime shown in FIGS. 5 and 6 is generally designated by the terms "oscillator mode locking, phase locking, or synchronization". In this type of laser emission, the energy is concentrated into narrow pulses which are much more powerful than the mean power and which are capable of presenting a maximum power $P_{max} \approx \overline{P}.(T/dt)$ (3) where T represents the period $2L/c$ in equation (1), and dt represents the reciprocal of the spectrum width $\Delta f$.

By way of example, an emission having a mean power $\overline{P}=1$ watt as produced by a neodymium-doped YAG crystal (with $\Delta f=10^{11}Hz$) in a resonant cavity having a length of 1.5 m, contains pulses having peak power of about 1,000 watts.

By obtaining high instantaneous powers from much smaller mean power it is possible to enlarge the field of application of laser sources, and the use of a laser emission of the phase mode-locked type thus presents increasing practical advantages. However, the various known solutions for obtaining phase mode-locked laser emission are not fully satisfactory at present.

Thus, with pulsed type laser generators in which the amplifying medium is flash-pumped, so-called "passive" phase locking is achieved by introducing a medium in the cavity having the property that is transparency changes as a function of light intensity. The medium is a mixture of a dye and a solvent (chlorobenzene, dichloroethane, etc.) and is referred to as a "saturable absorbent". This liquid is contained in a cell and has very low transparency at low levels of illumination, while its transparency becomes very high when the incident intensity exceeds a characteristic value: the saturation intensity. A light pulse whose intensity exceeds this threshold is transmitted with negligible attenuation. The emission from mode-locked pulse lasers is in the form of a sequence of about 15 short (30 ps) pulses spaced by about 10 ns, and amplitude modulated by an envelope whose time profile is Gaussian. The most powerful pulse conveys energy of about 1 mJ.

The use of a mixture of dye and solvent for obtaining phase locking suffers from several drawbacks, and the main drawbacks are the following:

dye density is critical and not very stable over time;

the saturable absorbent solution suffers from wear and must be frequently renewed (about every 40 hours of utilization);

these absorbents exist only for a small number of emission wave lengths and are not suitable for all types of laser;

these absorbents do not impose any upper limit on the intensity of the laser pulses, thus giving rise to poor power stability and to risk of damage to the component parts of the laser; and if the pumping repetition rate exceeds 1 Hz, it is necessary to provide means for circulating the dye.

For continuous laser generators, so-called "active" phase locking is generally used. For continuous pumping, the method of synchronizing the laser emission modes consists in periodically modulating the losses in the cavity at a frequency equal to c/2L of equation (2) above, by means of an acousto-optical modulator. Only the light signal which is in phase with the modulation can be amplified, such that the emerging laser beam is constituted by a continuous sequence of short light pulses, e.g. lasting about 100 picoseconds in YAG/Nd and argon lasers, which are spaced by 10 nanoseconds, for example. The energy of each of these pulses is about $10^{-8}J$.

This type of phase locking the modes of a continuous laser generator also suffers from drawbacks. Each emitted laser pulse results from a large number of round trip passes through the laser cavity. The modulation frequency of the acoustooptical element (which generally lies in the range 80 MHz to 100 MHz) must always correspond exactly to the reciprocal of the time taken by one round trip pass through the oscillator. As a result the modulator must be extremely stable and its stability must be exact to within about 10 Hz. The microwave frequency sources used must therefore be crystal stabilized and the modulation frequency must also be periodically readjusted in order to keep track of variations in the length of the cavity due to temperature variations. Further, and in general, the acousto-optical technique and its modulation source are expensive.

Overall, the various devices for phase locking the modes of a laser do not satisfy all of the practical desiderata.

An article by A. Barthelemy, S. Maneuf, and C. Froehly entitled "Soliton propagation and self-confinement of laser beams by Kerr optical non-linearity" published in the journal "Optics Communications" vol. 55, No. 3, Sept. 1, 1985, pp. 201–206, describes a method of obtaining reproducible stable propagation of intense laser radiation in the presence of self-induced variations of the refractive index of a medium whose refractive index depends on intensity.

However, the utilization of the soliton effect has been considered, in practice, only for highly specific applications such as shortening picosecond pulses in monomode optical fibers, as described, for example, in the article by L. F. Mollenauer, R. H. Stolen, and J. P. Gordan entitled "Experimental observation of picosecond pulse narrowing and solitons in optical fibers" published in the journal "Physical Review Letters" vol. 45, No. 13, Sept. 29, 1980, pp. 1095–1098.

A device called a "soliton laser" is proposed in an article by L. F. Mollenauer and R. H. Stolen entitled "The soliton laser" published in the journal "Optics Letters" vol. 9, No. 1, Jan. 1984, pp. 13–15. According to this article, a color-center mode-locked laser including conventional acousto-optical means for additional active modulation is coupled with a second "soliton pulse" cavity for providing external regulation to the main laser cavity of the conventional basic laser generator. The external regulation loop comprises a single mode non-linear dispersive fiber in which a picosecond pulse propagates. In order to ensure that the fiber possesses dispersion of appropriate sign, it is necessary for the basic laser generator to be of the continuous type with a wavelength of more than 1.3 $\mu$m.

Such a device suffers from all of the drawbacks mentioned above for mode-locked continuous laser generators and in particular from the need to use additional active modulation of the acousto-optical type, and it requires a second cavity to be implemented outside the cavity of the basic laser generator, together with the use of a non-linear dispersive fiber. The device is thus complex, bulky, difficult to adjust, and can only be used for a well-defined type of laser generator.

SUMMARY OF THE INVENTION

The object of the present invention is to remedy the above-mentioned drawbacks and to provide a mode-locked laser which is simple and reliable in design, which does not require frequent readjustment after its initial adjustment, which is capable of operating over a very wide range of wavelengths and which improves stability between successive pulses by virtue of the principles on which it operates.

These aims are achieved by means of a laser generator of the type specified at the beginning of the description, characterized in that it further comprises a device for phase-locking the modes of the laser generator, said device being placed between the amplifying active medium and the rear reflecting mirror and comprising, firstly a non-dispersive non-linear medium placed in contact with said rear mirror, and secondly means for transforming a Gaussian beam of circular symmetry coming from the amplifier medium into a beam of morphology suitable for soliton propagation in said non-linear medium.

Thus, the present invention is applicable to both continuous type generators and to pulsed type laser generators, regardless of wavelength. Inter-mode synchronization is provided by soliton propagation which itself takes place inside the cavity of the basic laser generator, and there is no need to add an additional modulator or an additional laser cavity to the basic laser generator. The pulsed quasi-monochromatic beam is propagated in a non-dispersive non-linear medium.

More particularly, in one embodiment of the invention, the means for transforming a Gaussian beam comprise a laser beam amplitude division interference device for forming two secondary wave, a space filter, and an afocal system disposed on the paths of the two secondary waves in order to form a reduced image of the interference pattern created in the amplitude division interference device, said image being formed on the inlet face to the non-linear medium opposite to the rear mirror.

The interference device, the afocal system, and the space filter may themselves be made in various different ways.

Thus, in a first implementation, the means for transforming a Gaussian beam comprise a Wollaston prism, a half-wave plate disposed on the path of one of the two secondary waves formed by the Wollaston prism, a first converging lens, a space filter, and a second converging lens.

In a second implementation, the means for transforming a Gaussian beam comprise a Wollaston prism, a half-wave plate disposed on the path of one of the two secondary waves formed by the Wollaston prism, first and second mirrors disposed on the paths of the two secondary waves to cause them to converge, and a space filter disposed in front of the non-linear medium.

In a third implementation, the means for transforming a Gaussian beam comprise an interference device constituted by a grating or a hologram creating two secondary waves, a first converging lens, a space filter, and a second converging lens.

Preferably, the means for transforming a Gaussian beam further comprise a cylindrical lens whose focus coincides with the inlet face to the non-linear medium in order to form an interference zone on said face having the shape of a highly elongate rectangle.

The non-linear medium may be constituted by a vat containing a uniform non-linear material such as carbon disulfide and having a transparent inlet face and a face opposite to the inlet face which is closed by the rear reflecting mirror.

However, in another possible embodiment, the non-linear medium comprises a transverse single-mode non-linear plane waveguide constituted by two layers of a transparent dielectric material having a low refractive index surrounding a non-linear material having a higher refractive index, and the rear mirror is in contact with the plane non-linear waveguide and perpendicular to the various layers constituting said waveguide.

In this case, the amplifying active medium may be constituted by a semiconductor laser diode having an outlet face subjected to anti-reflection treatment and the means for transforming a Gaussian beam may comprise a converging lens interposed between the laser diode and the transverse single-mode plane non-linear medium.

The amplifying active medium may also comprise a network of laser diodes implanted on a common substrate and presenting an outlet face which is subjected to anti-reflection treatment, and the means for transforming a Gaussian beam may comprise an optical system constituted by an afocal device and by a space filter for forming a simple image of the outlet face of the diode network on the inlet face of the non-linear waveguide in such a manner as to excite only one higher order mode.

BRIEF DESCRIPTION OF THE DRAWINGS

Other characteristics and advantages of the invention appear from the following description of particular embodiments of the invention given by way of example and with reference to the accompanying drawings, in which.

DETAILED DESCRIPTION OF THE PREFERRED EMBODIMENTS

It is initially recalled that the expression "non-linear material" means a material whose refractive index varies as a function of the intensity of the light beam passing through the material (see optical Kerr effect). Optical non-linearity is also often designated by the expression "self-induced variation of refractive index".

An essential means of the present invention resides in implementing soliton propagation for a special purpose which makes it possible to phase-lock the modes of a laser generator.

Figure 1:
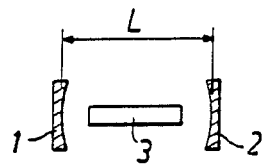
FIG. 1 is a diagram representing a conventional independent-mode laser generator.
Figure 2:
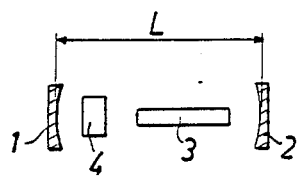
FIG. 2 is a diagram representing a conventional modelocked laser generator.
Figure 3:
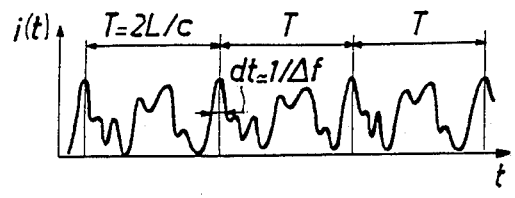
FIGS. 3 and 4 represent the time structure and the spectral structure respectively of an independent mode laser emission, i.e. they are graphs of the intensity i(t) of the emitted laser beam as a function of time t, and the intensity I(f) of the emitted laser beam as a function of frequency.
Figure 4:
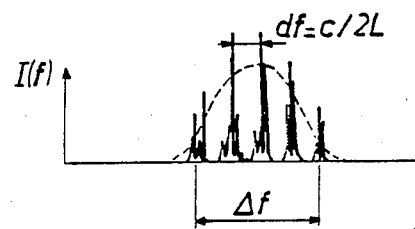
Figure 5:
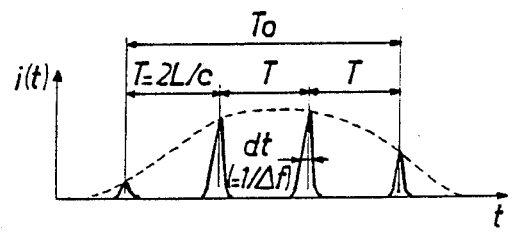
FIGS. 5 and 6 represent the time structure and the spectral structure respectively of a mode-locked laser emission and they are graphs of the intensity i(t) as a function of time t and of the intensity I(f) as a function of frequency f in the same manner as the graphs of FIGS. 3 and 4.
Figure 6:
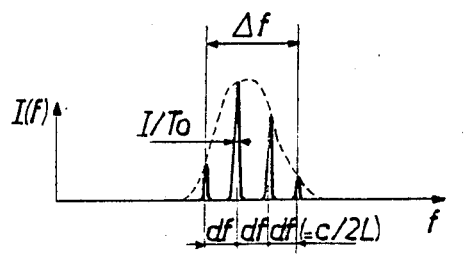
Figure 7:
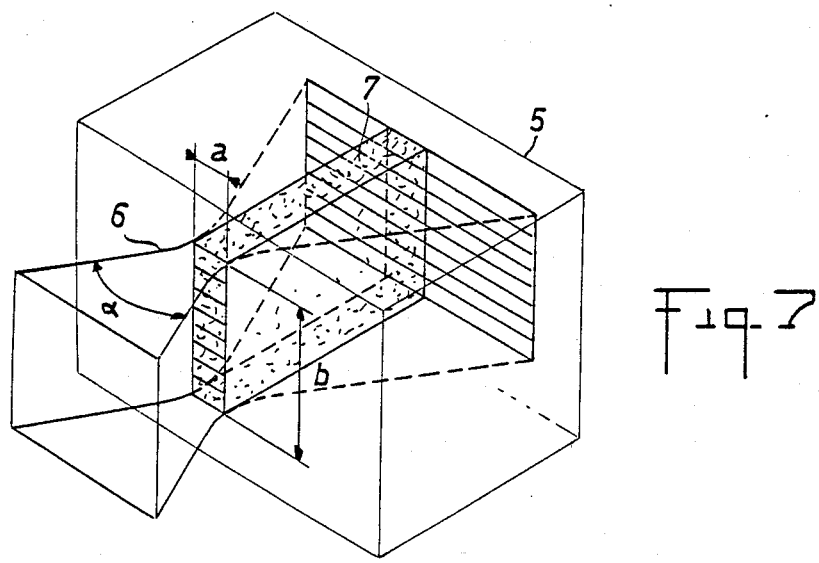
FIG. 7 is a perspective view showing the soliton self-confinement of a laser beam in a medium having Kerr non-linearity.

The description begins by briefly describing, with reference to FIG. 7, the soliton self-confinement of a laser beam in a medium 5 having Kerr non-linearity, such as carbon disulfide ($CS_2$), for example.

When considering a narrow laser beam of wavelength $\lambda$, of rectangular section $b \times a$ such that $b >> a$, and modulated by sinusoidal interference in the height direction b, it is observed that the beam diverges horizontally with the usual angular aperture $\alpha = \lambda/a$ so long as its power density remains less than a critical value $P_{sol}$ (curve 6), but that the beam generates its own vertical plane waveguide which exactly cancels its horizontal divergence on reaching the soliton power $P_{sol}$ (curve 7).

If special means are inserted in the resonant cavity of a laser generator, this reproducible phenomenon known as the "soliton effect" may contribute to phase-locking the modes of the laser emission while simultaneously performing power filtering of the laser.

This is now explained with reference to FIG. 8 which shows an example of a device suitable for implementing the present invention.

Figure 8:
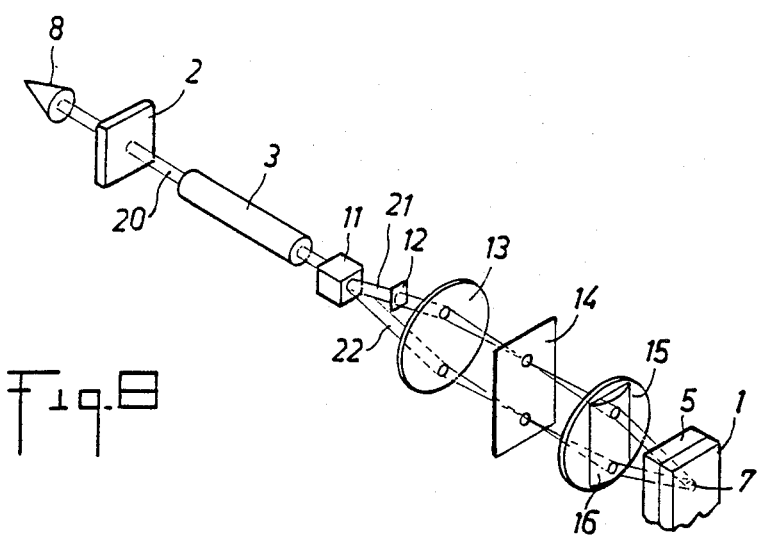
FIG. 8 is a perspective view of an example of a laser generator whose modes are phase-locked by a soliton beam in accordance with the present invention.
Figure 9:
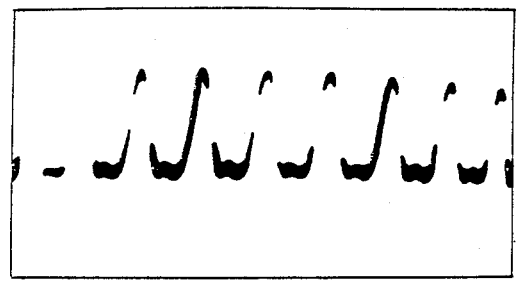
FIG. 9 shows an example of the electric signal waveform delivered by a rapid response photodetector on the basis of a laser emission having phase-locked modes provided in accordance with the invention.

Thus, FIG. 8 shows a laser generator having an outer mirror 2 whose transmissivity may be 35%, for example, and passing a mode-locked outlet laser beam 8. An amplifying active medium 3, e.g. a flash-pumped neodymium-doped glass rod suitable for being used over a diameter of 5 mm, for example, is interposed in conventional manner between the outlet mirror 2 and a totally reflecting rear mirror 1.

In accordance with the invention, a cell containing a non-dispersive linear medium 5, for example a vat containing a Kerr liquid such as carbon disulfide is placed in such a manner that the rear mirror 1 of the resonant cavity is in contact with the non-linear cell. The mirror 1 may thus directly constitute one of the faces of the vat containing the Kerr liquid 5.

Various optical components which are conventional in themselves are interposed between the amplifying medium 3 and the non-linear medium 5 for transforming the main laser beam passing through the amplifying medium 3 in such a manner that said beam whose symmetry about its axis is substantially Gaussian in conventional manner, is transformed into a beam whose morphology is suitable for soliton propagation on the inlet face to the non-linear medium 5 opposite from the rear mirror 1.

By way of example, FIG. 8 shows a Wollaston prism 11 which sets up an interference pattern and divides the main laser beam 20 into two secondary beams 21 and 22. A half-wave plate 12 is placed on one of the secondary beams to cause the orthogonal polarizations set up by the Wollaston prism 11 to be parallel. Two converging circular lenses 13 and 15 constitute an afocal system which forms a reduced image (e.g. by a factor of 4) of the interference pattern created in the Wollaston prism 11. A cylindrical lens 16 whose focus coincides with the plane of the inlet face to the cell 5 confines the horizontal dimension of the light beam so as to cause the interference zone to have the shape of a highly elongated rectangle (as in FIG. 7). A space filter 14 placed between the lenses 13 and 15 contributes to providing power filtering for the laser beam.

The device shown in FIG. 8 operates as follows:

At low power, the soliton beam does not exist: the rear mirror 1 receives a divergent cylindrical wave which does not correspond to one of the modes of the laser cavity. At soliton power, the rear mirror 1 receives a parallel beam capable of performing round trip passes between the mirrors 1 and 2 of the oscillator without distortion. The Q-factor of the cavity thus reaches its maximum at soliton power. If the amplifying medium 3 can provide this power, the oscillator produces produces a sequence of periodic pulses at powers equal to the soliton power diminished by the transmissivity factor of the outlet mirror 2.

If the illumination is too weak, then the beam diverges. If the illumination is greater than that required, a chaotic self-focusing process appears, thereby destroying both space and time coherence in the radiation. There are thus both upper and lower limits on the power needed to generate self-guided propagation of a geometrical soliton structure, and thus to the power of the pulses emitted by the laser generator.

The proposed technique which consists in introducing, in the laser generator, both a vat containing the Kerr liquid 5 and one of the mirrors 1 of the cavity, and also a device based on lenses and polarizing components for transforming a Gausien beam of circular symmetry into a beam of adequate morphology, provides the following advantages:

the device is adjusted once and for all and does not require frequent readjustment;

the device is suitable for operating over a very wide range of wavelengths (visible and near infra-red); and power stability between successive pulses is improved by virtue of the principle on which the device operates.

Figure 10:
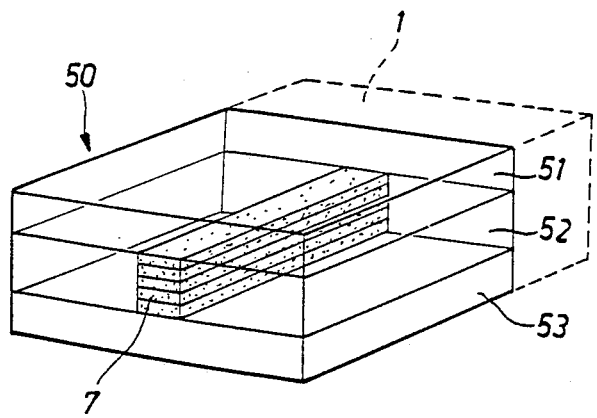
FIG. 10 is a perspective view of an example of a plane non-linear guide usable in a laser generator in accordance with the invention.

FIG. 10 shows an example of the electrical signal delivered by a nanosecond response photodetector receiving a mode-locked laser emission in accordance with the invention.

Various conventional optical combinations can be used to transform a normal beam having circular symmetry into a beam whose morphology is suitable for soliton propagation as needs to be presented at the inlet to the non-linear medium 5. Each of these combinations may give rise to a different configuration for the laser cavity.

Figure 11:
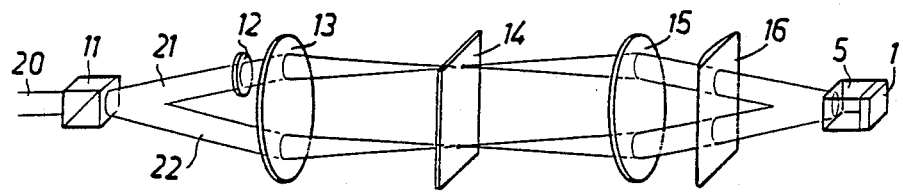
FIGS. 11 to 13 are diagrams showing three embodiments of devices for phase-locking the modes of a laser generator by using soliton propagation in a non-linear medium.

A first configuration which corresponds to the embodiment of FIG. 8 is shown on a larger scale in FIG. 11.

Figure 12:
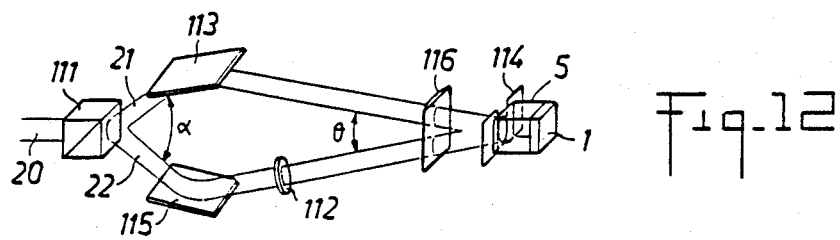

In a second possible configuration, shown in FIG. 12, the lenses 13 and 15 of FIG. 11 are replaced by two mirrors 113 and 115 for converging the secondary beams 21 and 22 formed by a Wollaston prism 111 analogous to the corresponding element 11 of FIG. 11. The half-wave plate 112 placed on one of the secondary beams 21 and 22 serves to make the polarizations of the beams 21 and 22 parallel. The cylindrical lens 116 performs the same function as the lens 16 in FIG. 11. A filter slot 114 is placed in front of the non-linear medium 5.

Figure 13:
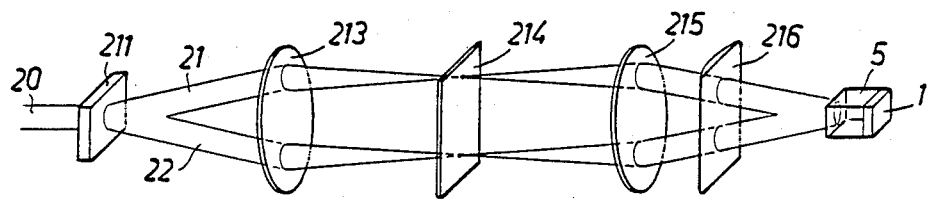
Figure 14:
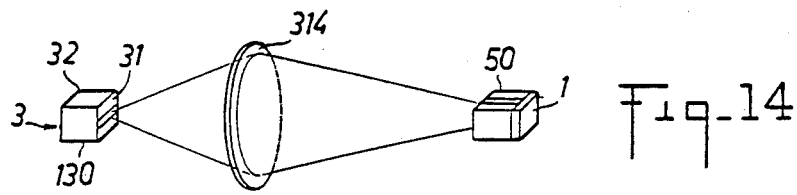
FIGS. 14 and 15 are diagrams showing laser generators whose modes are phase-locked by a soliton beam and implementing respectively a laser diode and a network of laser diodes.

In the configuration of FIG. 13, a grating or a hologram 211 is placed on the main beam 20 in order to form a network of interference fringes, and replaces the assembly constituted by the Wollaston prism 11 and the half-wave plate 12 of FIG. 11. Items 213 to 216 may be similar to items 13 to 16 of FIG. 11.

In the above, the case has been considered of a uniform non-linear medium constituted, for example, by a vat filled with a Kerr liquid 5.

However, a plane non-linear waveguide 50, as shown in FIG. 10, may replace the uniform non-linear material situated in contact with the rear mirror 11 in the scheme of FIGS. 8 and 11 to 13.

The FIG. 10 waveguide 50 combines soliton self-guidance in a plane (e.g. horizontal plane) with guidance in a perpendicular plane by means of the (horizontal in this case) walls of a plane light waveguide. This plane optical waveguide is constituted by two layers 51 and 52 of transparent dielectric having low refractive index $n_1$, serving as cladding and surrounding the non-linear (Kerr) medium 52 whose refractive index is higher than $n_1$ and which constitutes the core. The characteristic dimensions of the incident beam are chosen in such a manner that only one waveguide mode is excited (fundamental mode or a higher order mode).

The index $n_1$ of the layers 51 and 52 is greater than the index $n_O$ of the ambient medium in which the waveguide 50 is placed, but is always less than the variable index of the layer 52.

The use of a plane non-linear waveguide 50 is particularly advantageous when it is necessary to reduce the threshold at which the soliton beam forms, e.g. when the amplifying active medium 3 is continuously pumped and thus generates lower power.

In general, the non-linear material used to co-operate with the rear mirror 1 of the resonant cavity should be highly transparent at the emission wavelength, should have a high coefficient of variation in refraction index with intensity, and should have a Kerr effect response time which is less than the reciprocal duration of the amplification band of the amplifying medium.

The present invention is also applicable to laser generators of the semiconductor laser type. In this case, it is necessary to use a plane non-linear waveguide similar to that shown in FIG. 10.

For a laser diode 30, the diode should have a face 31 subjected to anti-reflection treatment and a lens 314, e.g. a sphero-cylindrical lens is disposed between the diode 30 and the non-linear plane waveguide 50 associated with the rear mirror 1 in order to adapt the beam to optimum injection into the transverse single-mode plane non-linear waveguide 50. The diode 30 has a cleved face 32 opposite to the face 31 given an anti-reflection treatment.

Figure 15:
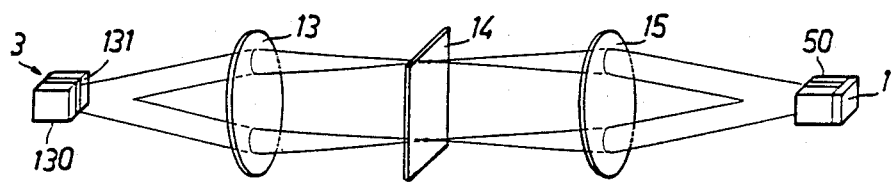

FIG. 15 shows a laser generator using a network of laser diodes 130 implanted in a common substrate and having a face 131 which is subjected to anti-reflection treatment. An optical system 13, 14, and 15 constituted by items similar to the corresponding items of FIG. 11 forms a simple image of the face 131 of the network of laser diodes 130 on the inlet face of the non-linear waveguide 50 so as to excite only one higher order mode.

What is claimed is:

1. A mode-locked laser generator comprising: a resonant cavity bounded by a rear reflecting mirror and an outlet semi-reflecting mirror with an active amplifying medium disposed therebetween, and a device for phase-locking the modes of the laser generator, said device being disposed between the amplifying active medium and the rear reflecting mirror said device having:
  (i) a non-dispersive non-linear medium adjacent to said rear mirror, and
  (ii) means for transforming a Gaussian beam of circular symmetry coming from the amplifier medium into a beam which travels by soliton propogation in said non-linear medium, said transforming means comprising a laser beam amplitude division interference device for forming two secondary waves, a space filter, and an afocal lens system disposed on the paths of the two secondary waves to form a reduced image of the interference pattern generated in the amplitude division interference device, said image being formed on an inlet of said to the non-linear medium opposite to the rear mirror, thereby providing a mode-locked laser in which solution propagation occurs inside said resonant cavity of said laser generator.

2. A laser generator according to claim 1, wherein the means for transforming a Gaussian beam comprises a Wollaston prism, a half-wave plate disposed on the path of one of the two secondary waves formed by the Wollaston Prism, a first converging lens, a space filter, and a second converging lens.

3. A laser generator according to claim 1, wherein the means for transforming a Gaussian beam comprises a Wollaston prism, a half-wave plate disposed on the path of one of the two secondary waves formed by the Wollaston prism, first and second mirrors disposed on the paths of the two secondary waves to cause them to converge, and a space filter disposed in front of the non-linear medium.

4. A laser generator according to claim 1, wherein the means for transforming a Gaussian beam comprises a interface device constituted by a grating creating two secondary waves, a first converging lens, a space filter, and a second converging lens.

5. A laser generator according to claim 1, wherein the means for transforming a Gaussian beam comprises a cylindrical lens whose focus coincides with the inlet face to the non-linear medium in order to form an interface zone on said face having the shape of a highly elongated rectangle.

6. A laser generator according to claim 1, wherein the non-linear medium comprises a vat containing a uniform non-linear material such as carbon disulfide and having a transparent inlet face and a face opposite to the inlet face which is closed by the rear reflecting mirror.

7. A laser generator according to claim 1, wherein the amplifying active medium comprises a flash-pumped neodymium-doped glass rod.

8. A laser generator according to claim 1, wherein the non-linear medium comprises a transverse single-mode non-linear plane waveguide constituted by two layers of a transparent dielectric material having a low refractive index ($n_1$) surrounding a non-linear material having a higher refractive index, and the rear mirror is adjacent to the plane non-linear waveguide and perpendicular to the various layers constituting said waveguide.

9. A laser generator according to claim 8, wherein the amplifying active medium comprises a continuously pumped laser amplifying medium.

10. A laser generator according to claim 8, wherein the amplifying active medium comprises a semiconductor laser diode having an outlet face with an antireflection coating and the means for transforming a Gaussian beam comprises a converging lens interposed between the laser diode and the transverse single-mode plane non-linear medium.

11. A laser generator according to claim 8, wherein the amplifying active medium comprises a network of laser diodes implanted on a common substrate and presenting an outlet face with an anti-reflection coating, and the means for transforming a Gaussian beam comprises an optical system constituted by a afocal device and by a space filter for forming a simple image of the outlet face of the diode network on the inlet face of the non-linear waveguide.

12. A laser generator according to claim 1, wherein the means for transforming a Gaussian beam comprises an interface device constituted by a hologram creating two secondary waves, a first converging lens, a space filter, and a second converging lens.

* * * * *